United States Patent [19]
Moss, Jr. et al.

[11] 3,855,331
[45] Dec. 17, 1974

[54] VINYL XYLENES AND METHOD

[75] Inventors: James H. Moss, Jr.; Calvin L. Daniels; Cleve H. Forward, all of Big Spring, Tex.

[73] Assignee: Cosden Oil & Chemical Company, Big Spring, Tex.

[22] Filed: Feb. 5, 1973

[21] Appl. No.: 329,831

[52] U.S. Cl. .................. 260/669 R, 260/671 R
[51] Int. Cl. .................. C07c 5/18, C07c 3/52
[58] Field of Search......... 260/671 R, 671 P, 669 R

[56] References Cited
UNITED STATES PATENTS

| | | | |
|---|---|---|---|
| 2,766,307 | 10/1956 | McCaulay et al. | 260/671 P |
| 3,335,197 | 8/1967 | Wennerberg | 260/669 R |
| 3,379,787 | 4/1968 | Amir | 260/671 P |
| 3,435,091 | 3/1969 | Hofmann et al. | 260/671 P |
| 3,525,776 | 8/1970 | Berger | 260/671 R |
| 3,539,650 | 11/1970 | Amir | 260/671 P |

Primary Examiner—C. Davis

[57] ABSTRACT 4-vinyl-1,2-dimethylbenzene and 5-vinyl-1,3-dimethylbenzene and their corresponding intermediates, 4-ethyl-1,2-dimethylbenzene and 5-ethyl-1,3-dimethylbenzene, are formed by Friedel-Crafts alkylation of xylenes with ethylene. The thus formed intermediate mixture of 4-ethyl-1,2-dimethylbenzene and 5-ethyl-1,3-dimethylbenzene may then be dehydrogenated to the corresponding vinyl isomers with or without preliminary separation and purification of the intermediates.

6 Claims, No Drawings

VINYL XYLENES AND METHOD

BACKGROUND OF THE INVENTION

This invention relates to production of vinyl xylenes and particularly vinyl xylenes in which the vinyl group is not adjacent to either of the methyl groups such as 1,2-dimethyl-4-vinylbenzene and 1,3-dimethyl-5-vinylbenzene; to their intermediate ethyl compounds from which they are formed by dehydrogenation of the corresponding ethyl xylenes; and to a method of preparation of these compounds first by Friedel-Crafts alkylation of xylene isomers or mixtures of such isomers with ethylene followed by dehydrogenation of the intermediate ethyl xylene.

These vinyl xylenes such as 1,2-dimethyl-4-vinylbenzene and 1,3-dimethyl-5-vinylbenzene are usefully polymerized into highly methylated polymers by polymerization with a peroxy-type catalyst. These highly methylated polymers upon oxidation such as with acid chromic oxide or alkaline potassium permanganate, nitric acid or the like, have their methyl groups converted to carboxy and therein are formed into useful ion exchange resins. Moreover, these vinyl xylenes are usefully copolymerized with various ethylenically and diethylenically unsaturated monomers such as styrene, divinylbenzene, lower alkyd such as methyl or ethyl acrylate or methacrylate esters, vinyl chloride or acetate, acrylonitrile; forming a modified copolymerized product such as with polystyrene of slightly lower melting point, but which upon oxidation, sulfonation or chloromethylation may be converted to a workable commercial plastic having good ion exchange properties. Again, the vinyl xylenes hereof may be usefully used for terminal polymerization such as graft copolymerization upon such preformed polymers of ethylenically unsaturated compounds as listed above, the polyvinyl xylene compounds imparting a terminal graft upon the parent polymeric substance imparting modified such as lower melting properties thereto. Again, the vinyl polymer may also be polymerized together with monomers of ethylenically unsaturated polymerizable compounds as listed above, into block copolymers formed for purposes of modifying the normal properties of such common commercial polymers to better impact strengths as well as lower melting points. Thus in summary of the utilities, the polyvinyl xylenes hereof may be copolymerized, graft polymerized or block copolymerized with the common, ethylenically unsaturated polymerizable monomers or used in blends therewith for modifying the properties of such common polymeric substances. These common commercial polymers will be recognized to be polystyrenes, polylower acrylate esters such as polymethyl methacrylate and polyethyl acrylate, polyvinyl chloride, polyvinyl acetates and common copolymers thereof with acrylonitrile such as polymerized styreneacrylonitrile monomeric mixtures. Moreover, these polymeric substances are usually modified by effecting their copolymerization in the presence of small amounts of rubber, maleic anhydride and other alkyd type resins to produce modified polymers, such as to impart improved hardness or impact strength to the polymers. Other vinyl xylenes in which the vinyl group is adjacent to a methyl group are comparatively inactive.

In forming the compounds the intermediate 1,2-dimethyl-4-ethylbenzene or 1,3-dimethyl-5-ethylbenzene are first formed by respectively alkylating the ortho- meta-xylene or mixtures or ortho-, meta- and para-xylenes, with ethylene using a Friedel-Crafts catalyst, typically aluminum chloride promoted with a small quantity of hydrochloric acid as a promoter or an equivalent amount of water, the latter interacting with the aluminum chloride forming an equivalent amount of hydrochloric acid. The alkylation is effected by passing the ethylene gas into the xylenes in the presence of a rapidly stirred suspension of about 1 to 10% of solid anhydrous aluminum chloride usually containing an excess of about 100% xylene, sufficient excess to act as a solvent. The stirred mixture has the ethylene bubbled therein while cooling to a controlled temperature, the reaction running exothermically. Most commonly the xylene and catalyst are stirred while at the selected temperature, cooling sufficient to prevent substantially higher temperatures from being reached, above the selected range. The quantity of ethylene is usually controlled to about 0.1 to 2 mols, preferably below 1 mol, of ethylene per mol of xylene. The quantity of aluminum chloride is about 1 to 10% by weight of the quantity of xylene to be reacted. The hydrochloric acid is present non-critically in quantity of about 0.1 to 10% of the catalyst.

The reaction upon the xylene in the presence of this catalyst tends, responsive to certain temperatures such as above 80°C, to produce some trans-alkylation. Below about 70°C an undesirable quantity of 1,2-dimethyl-3-ethylbenzene is formed. For maximum yield of the desired 1,2-dimethyl-4-ethylbenzene and 1,3-dimethyl-5-ethylbenzene the temperature is controlled to the range of about 75°C to 100°C, preferably 75°C to 95°C. Upon completion of the reaction it will be found that the product is predominantly 1,2-dimethyl-4-ethylbenzene and 1,3-dimethyl-5-ethylbenzene which can be increased in content by maintaining the temperature in the narrow range of 85°C to 95°C.

The product may be distilled to purify the 1,2-dimethyl-4-ethylbenzene isomer or the 1,3-dimethyl-5-ethylbenzene isomer from each other and from other isomeric dimethyl ethylbenzene products which form in minor quantity by trans-alkylation as impurity. However, it is not necessary for conversion of these products to their useful vinyl counter-parts to purify the initial mixture beyond removal of the alkylation catalyst and the other dialkylated products since the reaction mixture formed in the alkylation of predominantly one of the desired isomers or the other can be directly treated by dehydrogenation to the corresponding mixed vinyl compound which will predominantly contain the desired isomers. Thus the reaction mixture formed by alkylating at about 85°C, predominantly 1,2-dimethyl-4-ethylbenzene and 1,3-dimethyl-5-ethylbenzene is separated from the catalyst complex by washing and distilling to separate the close boiling mixture of desired isomers. Generally the product after separating the supernatant liquid from a sludge of catalyst complex is directly treated to dehydrogenate the ethyl radical.

The dehydrogenation is effected by passing the vapors of the ethyl xylene together with steam over a dehydrogenation catalyst such as the common, commercially available Shell 105 catalyst at high temperatures such as about 1050°F to 1400°F. Generally the vapors are mixed with steam in the ratio of above 2 parts of steam per part of hydrocarbon vapor, preferably 2 to 10 parts, and the mixed vapors are passed over the catalyst. The LHSV of the hydrocarbon over the preferred catalyst is within the range of 0.1 to 5. The Shell 105 catalyst is a mixture predominantly of ferric oxide as a carrier mixed with a minor quantity of potassium oxide and chromic oxide. The typical commercial composition is 87.9 $Fe_2O_3$, 2.5 $Cr_2O_3$, 9.6 $K_2O$ as weight percent of the solid catalyst mixture.

The following examples illustrate the practice of this invention:

EXAMPLE 1

1 mol of orthoxylene is mixed to form a suspension therein of 2.5% by weight of the mixture of aluminum chloride and 0.2% by weight of water, in a flask equipped with a high speed stirrer. 0.9 mol of ethylene is bubbled into the xylene with stirring initially at room temperature, the temperature rising rapidly exothermically to reach 85°C to 95°C and is controlled in this range by cooling after the reaction is initiated for the remainder of the reaction. The product formed is as follows:

| | |
|---|---|
| Lights | 0.8 |
| Unreacted xylenes | 16.3 |
| Intermediates | 8.5 |
| 5-ethyl m-xylene | 3.7 |
| 2-ethyl p-xylene | 1.4 |
| 4-ethyl m-xylene | 2.1 |
| 4-ethyl o-xylene | 48.0 |
| 2-ethyl m-xylene | 0.3 |
| 3-ethyl o-xylene | 2.9 |
| Heavies | 16.0 |
| Selectivity to 1,2-dimethyl-4-ethyl-benzene and 1,3-dimethyl-5-ethylbenzene | 90.5 |

It will be seen that the product is predominantly 1,2-dimethyl-4-ethylbenzene with some 1,3-dimethyl-5-ethylbenzene by transalkylation. It will be seen, moreover, that the selectivity to produce the 4-ethyl isomer and the 5-ethyl isomer in lesser degree by transalkylation is highly selective, whereby the ethyl group does not attach in significant quantity adjacent to one of the methyl groups of the benzene ring.

EXAMPLE 2

The product of Example 1 is fractionally distilled to separate a fraction of substantially pure 1,3-dimethyl-5-ethylbenzene boiling at about 183°–184°C from a larger fraction of 1,2-dimethyl-4-ethylbenzene boiling at 189°–190°C.

EXAMPLE 3

A mixture of ethyl xylenes comprising predominantly 1,2-dimethyl-4-ethylbenzene and a smaller quantity of 1,3-dimethyl-5-ethylbenzene, the mixture being identified more exactly in the table below, are dehydrogenated by passing over a Shell 105 catalyst as identified above, together with steam in a ratio of about 2 to 3 parts of steam per part of hydrocarbon vapor at a temperature of about 1280°F. The reaction conditions, the feed composition and the product formed are set forth in the table below:

| Catalysts | Shell 105 Styrene Catalysts |
|---|---|
| Reactor temperature | 1280°F |
| Feed (LHSV) | 0.32 |
| $H_2O$ (LHSV) | 2.39 |
| Yield | 52.00 |
| Selectivity | 57.7 |
| Conversion | 90.2 |

| | Feed | Product |
|---|---|---|
| Light Materials | 12.5 | 43.0 |
| 1,3-dimethyl-5-ethylbenzene | 37.6 | 4.2 |
| 1,4-dimethyl-2-ethylbenzene | 8.2 | 0.7 |
| 1,3-dimethyl-4-ethylbenzene | 9.8 | 0.7 |
| 1,2-dimethyl-4-ethylbenzene | 29.6 | 2.9 |
| 1,3-dimethyl-2-ethylbenzene | 1.4 | — |
| 1,2-dimethyl-3-ethylbenzene | 0.7 | — |
| 1,3-dimethyl-5-vinylbenzene | — | 27.8 |
| 1,2-dimethyl-4-vinylbenzene | — | 17.3 |
| Heavies | 0.8 | 5.1 |

EXAMPLE 4

A mixture of predominantly 1,3-diethyl-5-ethylbenzene and 1,2-dimethyl-4-ethylbenzene, the composition being more specifically set forth in the table below, are passed over the Shell 105 catalyst under reaction conditions and feed rate together with steam as set forth in the table below. The feed and product obtained are as identified in the table.

| | |
|---|---|
| Steam preheat | 1290°F |
| Reactor temperature, lower | 1230°F |
| Reactor temperature, middle | 1170°F |
| Reactor temperature, top | 1160°F |
| Reactor temperature, exit | 1110°F |
| Feed Rate | 80 |
| $H_2O$: Hydrocarbon (vol./vol.) | 7:1 |
| Yield | 52.0% |
| Selectivity | 58.0% |
| Conversion | 89.8% |

| | Feed (%) | Product (%) |
|---|---|---|
| Light Materials | 4.0 | 36.3 |
| 1,3-dimethyl-5-ethylbenzene | 11.9 | 1.4 |
| 1,4-dimethyl-2-ethylbenzene | 4.3 | 0.4 |
| 1,3-dimethyl-4-ethylbenzene | 7.0 | 0.3 |
| 1,2-dimethyl-4-ethylbenzene | 67.6 | 7.3 |
| 1,3-dimethyl-2-ethylbenzene | 1.8 | 0.1 |
| 1,2-dimethyl-3-ethylbenzene | 2.0 | 0.1 |
| 1,3-dimethyl-5-vinylbenzene | — | 8.4 |
| 1,2-dimethyl-4-vinylbenzene | — | 43.1 |
| Heavies | 0.3 | 1.5 |

EXAMPLE 5

Another run for dehydrogenation of a mixture of 1,3-dimethyl-5-ethylbenzene and 1,2-dimethyl-4-ethylbenzene was made as set forth in the following table:

| | |
|---|---|
| Reactor temperature | 1380°F |
| Feed (LHSV) | 0.25 |
| $H_2O$ (LHSV) | 0.95 |
| Yield | 30.1% |
| Selectivity | 31.1% |
| Conversion | 96.8% |

| | Feed (%) | Product (%) |
|---|---|---|
| Light Materials | 2.9 | 64.6 |
| 1,3-dimethyl-5-ethylbenzene | 15.8 | 1.0 |
| 1,4-dimethyl-2-ethylbenzene | 3.5 | 0.1 |
| 1,3-dimethyl-4-ethylbenzene | 6.9 | 0.1 |
| 1,2-dimethyl-4-ethylbenzene | 66.2 | 1.9 |
| 1,3-dimethyl-2-ethylbenzene | 3.7 | — |
| 1,2-dimethyl-3-ethylbenzene | — | — |
| 1,3-dimethyl-5-vinylbenzene | | 8.4 |
| 1,2-dimethyl-4-vinylbenzene | | 20.5 |
| Heavies | 1.0 | 0.4 |

EXAMPLE 6

Example 1 was substantially repeated with the exception that a mixed xylene feed was employed in a ratio of 1 mole xylene feed per 0.25 mole ethylene. In addition, the temperature was maintained at 75° to 85°C during the run. The mixed xylene feed contained 9.5 wt. % para-xylene, 59.4 wt. % meta-xylene and 30.6 wt. % ortho-xylene. The product had the following composition:

|  | Wt. % |
|---|---|
| Light ends | 1.8 |
| Unreacted xylenes | 42.4 |
| Intermediates | 8.0 |
| 5-ethyl meta-xylene | 15.8 |
| 2-ethyl para-xylene | 5.7 |
| 4-ethyl meta-xylene | 4.7 |
| 4-ethyl ortho-xylene | 14.3 |
| 2-ethyl meta-xylene | 0.5 |
| 3-ethyl ortho-xylene | 1.0 |
| Heavies | 3.9 |
| Selectivity to the 1,2-dimethyl-4-ethyl-benzene and 1,3-dimethyl-5-ethylbenzene | 63.3 |

The above run was repeated employing another mixed xylene feed having the composition 4.1 wt. % ethylbenzene, 18.4 wt. % para-xylene, 49.2 wt. % meta-xylene, 27.1 wt. % ortho-xylene and 1.0 wt. % cumene. In addition, the temperature was maintained at about 30°C. The following product was obtained:

|  | Wt. % |
|---|---|
| Light ends | 3.5 |
| Unreacted xylenes | 67.6 |
| Intermediates | 1.8 |
| 5-ethyl meta-xylene | 1.6 |
| 2-ethyl para-xylene | 2.4 |
| 4-ethyl meta-xylene | 6.7 |
| 4-ethyl ortho-xylene | 4.7 |
| 2-ethyl meta-xylene | 2.9 |
| 3-ethyl ortho-xylene | 2.1 |
| Heavies | 5.8 |
| Selectivity to 1,2-dimethyl-4-ethyl-benzene and 1,3-dimethyl-5-ethylbenzene | 30 |

EXAMPLE 7

The reaction product of Example 5 was fractionally distilled under reduced pressure of 10 mm Hg. and 1,3-dimethyl-5-vinylbenzene was separated in a lower boiling fraction from 1,2-dimethyl-4-vinylbenzene.

Thus, the 4-vinyl-1,2-dimethylbenzene and 5-vinyl-1,3-dimethylbenzene in a mixture as produced in Examples 3–5 may be used for further polymerization either directly as formed; or may be used as formed merely with separation of the lighter and heavier components of the reaction mixture by fractional distillation, usually under reduced pressure; or as shown in Example 5 the 4-vinyl-1,2-dimethylbenzene fraction may be separated from the 5-vinyl-1,3-dimethyl benzene fraction by fractional distillation under reduced pressure. The crude product formed may also be further purified by drying and decolorizing before polymerization according to the usual procedures known in the art.

What is claimed is:

1. The method of forming ethyl xylenes with the ethyl group predominantly attaching non-adjacent in its ring position to the methyl groups on the benzene ring comprising alkylating a xylene selected from the group consisting of ortho-xylene, meta-xylene, mixtures thereof and mixtures thereof containing para-xylene, with ethylene in the presence of an anhydrous aluminum chloride Friedel-Crafts catalyst promoted with hydrochloric acid or its water equivalent at a temperature in the range of about 75° to 100°C.

2. The method as defined in claim 1 wherein the alkylation temperature is controlled to the range of 85°C to 95°C to produce a reaction mixture containing predominantly 4-ethylortho xylene and 5-ethyl meta xylene and purifying the mixture to separate the 4-ethylortho xylene and 5-ethyl meta xylene.

3. The method of preparing vinyl xylenes in which the vinyl group predominantly attaches non-adjacent in the ring position to the methyl groups on the benzene ring, comprising alkylating 1,2-dimethylbenzene, 1,3-dimethylbenzene or a mixture thereof with ethylene in the presence of a Friedel-Crafts catalyst consisting of anhydrous aluminum chloride promoted with hydrochloric acid or its water equivalent at a temperature in the range of 75°C to 95°C to form a mixture containing predominantly 4-ethyl-1,2-dimethylbenzene and 5-ethyl-1,3-dimethylbenzene, and then dehydrogenating the said mixture to form a reaction mixture containing predominantly 4-vinyl-1,2-dimethylbenzene and 5-vinyl-1,3-dimethylbenzene.

4. The method of claim 3 wherein 1,2-dimethylbenzene is alkylated.

5. The method of claim 3 wherein 1,3-dimethylbenzene alone is alkylated.

6. The method of preparing 4-vinyl-1,2-dimethylbenzene comprising alkylating ortho-xylene with ethylene at a temperature in the range of 85°C to 95°C in the presence of anhydrous aluminum chloride, promoted with hydrochloric acid or its water equivalent, to separate a fraction comprising predominantly 4-ethyl-1,2-dimethylbenzene and dehydrogenating said 4-ethyl-1,2-dimethylbenzene fraction to form a reaction mixture containing predominantly 4-vinyl-1,2-dimethylbenzene.

* * * * *